April 14, 1959

H. I. CHAMBERS 2,881,640

SPEED CHANGE TRANSMISSION

Filed May 23, 1955

INVENTOR.
HERBERT I. CHAMBERS

BY
Christie, Parker & Hale
ATTORNEYS

April 14, 1959 H. I. CHAMBERS 2,881,640
SPEED CHANGE TRANSMISSION
Filed May 23, 1955 2 Sheets-Sheet 2

INVENTOR.
HERBERT I. CHAMBERS
BY
Christie, Parker & Hale
ATTORNEYS

United States Patent Office 2,881,640
Patented Apr. 14, 1959

2,881,640

SPEED CHANGE TRANSMISSION

Herbert I. Chambers, Pasadena, Calif., assignor, by mesne assignments, to Consolidated Electrodynamics Corporation, Pasadena, Calif., a corporation of California Application May 23, 1955, Serial No. 510,433

16 Claims. (Cl. 74—681)

This invention relates to speed controls and has particular reference to apparatus for transmitting rotary movement between a first shaft and a second shaft and providing a selection of speed ratios between the shafts.

The invention may be called a speed change transmission and is useful in conjunction with mechanical systems wherein it is desirable to provide a selection of one or more rotational speeds. The invention is especially useful for providing an accurate selection of rotary speeds for a paper chart drive or tape drive on recording instruments such as oscillographs, tape recorders and the like.

The majority of oscillograph instruments rely upon a manual change of gears for changes in chart speed. This usually requires the loosening of screws or nuts with the hazard of dropping accurate and precision made parts, and is a time consuming process.

Some have attempted to solve this problem by using a train of gears and a sliding drive pinion which is placed in mesh with a section of the train to give a desired paper chart speed. This method involves accumulated error in chart position due to the train of gears and a noisy gear clash when changing speeds. This ultimately results in wear and malfunction. No provision is made to change speed without a pause or break in recording.

Others have attempted to solve this problem by using a continuous change method in which disks, balls or drums are used to vary speed ratios. These unfortunately are not positive in action, are noisy at high speeds and tend to deteriorate rapidly with age and use, resulting in inaccurate speed ratios.

The speed change transmission of the present invention overcomes these difficulties and in addition provides other desirable features. It comprises at least two rotatable shafts, a plurality of controllable clutching means coupled to one of the shafts, and a plurality of mechanical linkages coupling each clutching means to the other shaft.

In one embodiment of the invention, the transmission utilizes a differential having a first rotatable member, a second rotatable member and a third rotatable member, the members of the differential being intercoupled so that the rotational speed of the first member combined with the rotational speed of the second member determines the rotational speed of the third member. Means are provided for coupling the first rotatable member of the differential to the first rotatable shaft. A plurality of controllable clutching means are provided for coupling the second rotatable member of the differential to the first shaft. Means are provided for coupling the third rotatable member of the differential to the second rotatable shaft.

The transmission of the invention is positive in action, simple and rugged. It provides high rotational speed ratios between the first and second rotatable shafts with accuracy and low vibration, and the multiple clutching means affords a selection or change of speed ratios which is smooth and practically instantaneous.

The invention is explained in detail with reference to the accompanying drawings, in which.

Figure 1:
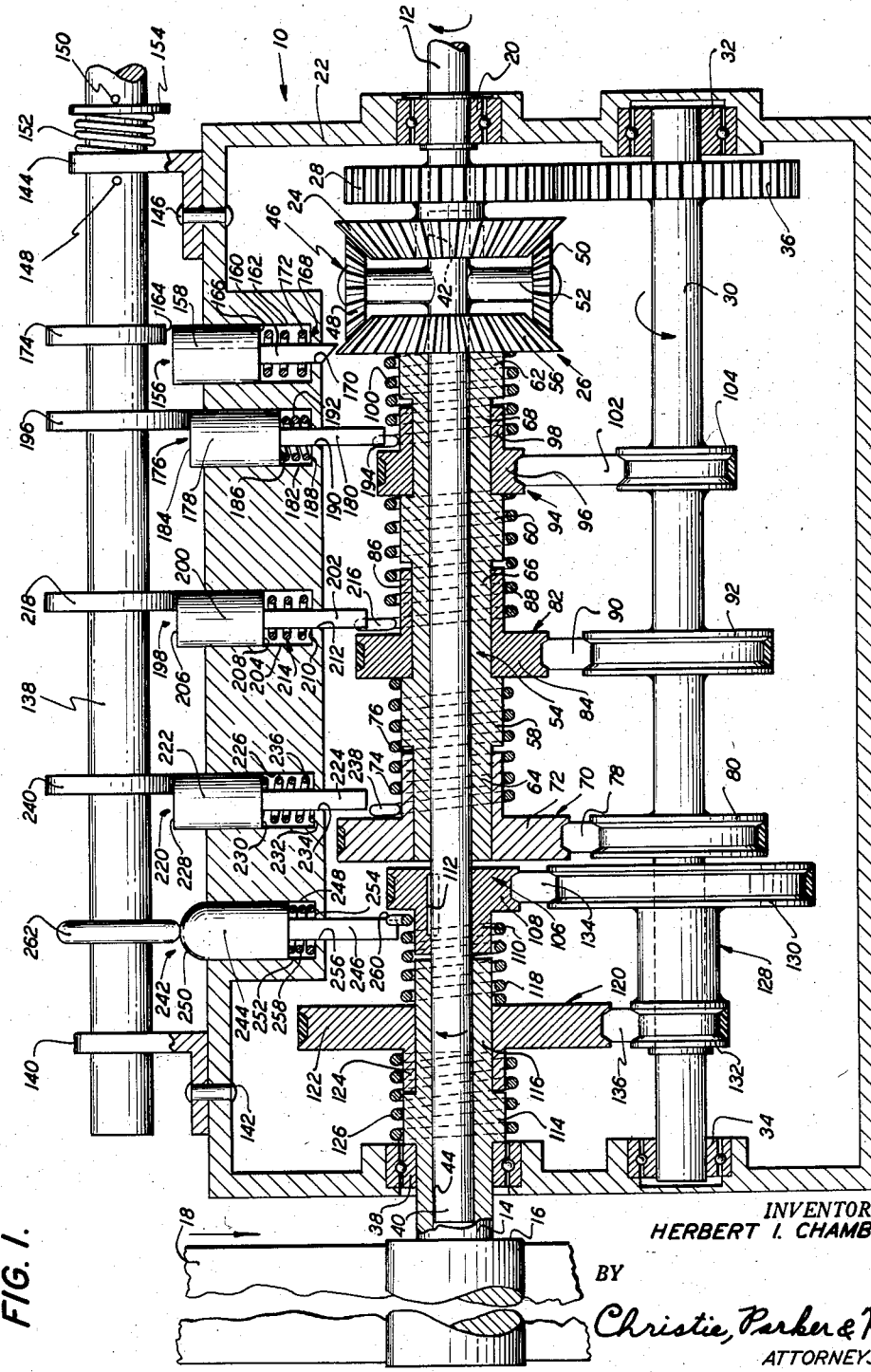
Fig. 1 is a partial sectional view of an embodiment of the invention utilizing a differential.

With reference to Fig. 1, a speed change transmission 10 includes a first rotatable shaft 12 and a second rotatable shaft 14, the second shaft being connected to a cylindrical drive member 16 for driving a paper chart 18.

The first shaft extends through a first free bearing 20 which is mounted through one end of a transmission housing 22. A first main bevel gear 24 of a mechanical differential 26 is fixed coaxially on the end of the first shaft inside the housing, and a first jack-shaft gear 28 is fixed coaxially on the first shaft at a position intermediate the differential and the first free bearing.

A first auxiliary shaft or jack-shaft 30 is disposed apart from and approximately parallel to the first shaft, and is rotatably mounted in second and third free bearings 32, 34 disposed at opposite ends of the housing respectively. A second jack-shaft gear 36 is fixed coaxially on the first auxiliary shaft and meshes with the first jack-shaft gear.

The second shaft 14 is disposed in line with the axis of the first shaft 12 and is mounted through a fourth free bearing 38 at the opposite end of the housing. A second auxiliary shaft 40 extends between the first and second shafts, one of its ends being rotatably held in a center bore 42 of the first shaft and its other end being rotatably held in a center bore 44 of the second shaft.

A spider gear assembly 46 of the differential is fixed to the second auxiliary shaft. The spider gear assembly includes a first spider gear 48 and a second spider gear 50 rotatably mounted on opposite ends of a spider shaft 52 respectively. The spider shaft is disposed with its axis perpendicular to the axis of the second auxiliary shaft and extends through the second auxiliary shaft to which it is fixed. The spider gears mesh with the first main bevel gear of the differential.

A third auxiliary shaft 54 is rotatably mounted on the second auxiliary shaft between the second shaft and the differential. A second main bevel gear 56 is affixed coaxially on one end of the third auxiliary shaft so that it faces the first main bevel gear and meshes with the spider gears of the differential. The third auxiliary shaft has first, second and third greater diameter portions 58, 60, 62 and first, second and third lesser diameter portions 64, 66, 68, the greater and lesser diameter portions being disposed alternately along its length.

A first collar member 70 having a pulley portion 72 and a cylindrical portion 74 is rotatably mounted on the first lesser diameter portion 64 of the third auxiliary shaft. The cylindrical portion of the first collar has an outer diameter approximately equal to the outer diameter of the first greater diameter portion 58 of the third auxiliary shaft, and is disposed adjacent this greater diameter portion. A first coil spring 76 is disposed coaxially on both the cylindrical portion of the first collar and adjacent greater diameter portion of the third auxiliary shaft, and holds on to these two portions in a spring grip. The pulley portion of the first collar member is mechanically coupled by a first continuous belt 78 to a first corresponding pulley 80 which is fixed coaxially on the first auxiliary shaft.

A second collar member 82 having a pulley portion 84 and a cylindrical portion 86 is rotatably mounted on the second lesser diameter portion 66 of the third auxiliary shaft. The cylindrical portion of the second collar has an outer diameter approximately equal to the outer diameter of the second greater diameter portion 60 of the third auxiliary shaft and is disposed adjacent this greater diameter portion. A second coil spring 88 is disposed coaxially on both the cylindrical portion of the second collar and adjacent greater diameter portion of the third auxiliary shaft, and holds on to these two portions in a spring grip. The pulley portion of the second collar member is mechanically coupled by a second continuous belt 90 to a second corresponding pulley 92 which is fixed coaxially on the first auxiliary shaft.

A third collar member 94 having a pulley portion 96 and a cylindrical portion 98 is rotatably mounted on the third lesser diameter portion 68 of the third auxiliary shaft. The cylindrical portion of the third collar has an outer diameter approximately equal to the outer diameter of the third greater diameter portion 62 of the third auxiliary shaft and is disposed adjacent this greater diameter portion. A third coil spring 100 is disposed coaxially on both the cylindrical portion of the third collar and adjacent greater diameter portion of the third auxiliary shaft, and holds on to these two portions in a spring grip. The pulley portion of the third collar member is mechanically coupled by a third continuous belt 102 to a third corresponding pulley 104 which is fixed coaxially on the first auxiliary shaft.

A fourth collar member 106 having a pulley portion 108 and a cylindrical portion 110 is disposed coaxially on the second auxiliary shaft between the second shaft and the third auxiliary shaft, and is fixed thereto by a pin 112. The end of the second shaft is in the form of a collar member and has a greater diameter portion 114 and a lesser diameter portion 116. The outside diameter of the cylindrical portion of the fourth collar member is approximately equal to that of the lesser diameter portion of the second shaft, and is disposed adjacent this lesser diameter portion. A fourth coil spring 118 is disposed coaxially on the cylindrical portion of the fourth collar member and extends onto the lesser diameter portion of the second shaft, holding on to the two portions in a spring grip.

A fifth collar member 120 having a pulley portion 122 and a cylindrical portion 124 is rotatably mounted on the lesser diameter portion of the second shaft between the fourth coil spring 118 and the greater diameter portion of the second shaft. The outside diameter of the cylindrical portion of the fifth collar member is approximately equal to that of the greater diameter portion of the second shaft. A fifth coil spring 126 is disposed coaxially on both the cylindrical portion of the fifth collar member and the greater diameter portion of the second shaft, holding on to these two portions in a spring grip.

A sixth collar member 128 having a first pulley portion 130 and a second pulley portion 132 is rotatably mounted on the first auxiliary shaft. A fourth continuous belt 134 acts as a mechanical coupling between the first pulley portion of the sixth collar member and the pulley portion of the fourth collar member. A fifth continuous belt 136 acts as a mechanical coupling between the second pulley portion of the sixth collar member and the pulley portion of the fifth collar member.

A control rod 138 is disposed apart from and parallel to the transmission shafts, and is rotatably and slidably mounted to the housing by a first eye member 140 secured to the housing by a rivet 142 and a second eye member 144 secured to the housing by a rivet 146.

A first rod pin 148 extends through the rod on one side of the second eye member, and a second rod pin 150 extends through the rod on the opposite side of the second eye member so as to restrict the allowable sliding movement of the rod. A rod spring 152 and a washer 154 are disposed coaxially on the rod between the second eye member and the second rod pin.

A first pawl member 156 having a cylindrical piston portion 158 and a probe portion 160 is disposed slidably in a first cylinder 162 drilled in the housing. The piston portion of the first pawl has a substantially flat top surface 164 and a bottom surface 166, and the first cylinder has a bottom surface 168 in which there is an opening 170 to the inside of the housing. A first pawl spring 172 is disposed in the first cylinder coaxially around the probe portion of the first pawl so that the bottom surface of the piston portion rests on the spring and the spring rests on the bottom surface of the cylinder. The probe portion of the first pawl extends through the opening in the bottom surface of the cylinder, and depression of the pawl causes the pawl spring to compress and the probe portion to engage the teeth of the second main bevel gear of the differential to prevent the gear from rotating. Depression of the first pawl is accomplished by means of a first cam 174 fixed to the rod 138 and adapted to contact the top surface of the piston portion of the pawl by rotation of the rod.

A second pawl member 176 having a cylindrical piston portion 178 and a probe portion 180 is disposed slidably in a second cylinder 182 drilled in the housing. The piston portion of the second pawl has a substantially flat top surface 184 and a bottom surface 186, and the second cylinder has a bottom surface 188 in which there is an opening 190 to the inside of the housing. A second pawl spring 192 is disposed in the first cylinder coaxially around the probe portion of the second pawl so that the bottom surface of the piston portion rests on the spring and the spring rests on the bottom surface of the cylinder. The probe portion of the second pawl extends through the opening in the bottom surface of the cylinder, and depression of the pawl causes the pawl spring to compress and the probe portion to engage an upturned end portion 194 of the third coil spring 100 for obstructing the rotation of this spring in a manner causing it to relax its spring grip. Depression of the second pawl is accomplished by means of a second cam 196 fixed to the rod 138 and adapted to contact the top surface of the piston portion of the pawl by rotation of the rod.

A third pawl member 198 having a cylindrical piston portion 200 and a probe portion 202 is disposed slidably in a third cylinder 204 drilled in the housing. The piston portion of the third pawl has a substantially flat top surface 206 and a bottom surface 208, and the third cylinder has a bottom surface 210 in which there is an opening 212 to the inside of the housing. A third pawl spring 214 is disposed in the third cylinder coaxially around the probe portion of the third pawl so that the bottom surface of the piston portion rests on the spring and the spring rests on the bottom surface of the cylinder. The probe portion of the third pawl extends through the opening in the bottom surface of the cylinder, and depression of the third pawl causes the pawl spring to compress and the probe portion to engage an upturned end portion 216 of the second coil spring 88 for obstructing the rotation of this spring in a manner causing it to relax its spring grip. Depression of the third pawl is accomplished by means of a third cam 218 fixed to the rod 138 and adapted to contact the top surface of the piston portion of the pawl by rotation of the rod.

A fourth pawl member 220 having a cylindrical piston portion 222 and a probe portion 224 is disposed slidably in a fourth cylinder 226 drilled in the housing. The piston portion of the fourth pawl has a substantially flat top surface 228 and a bottom surface 230, and the fourth cylinder has a bottom surface 232 in which there is an opening 234 to the inside of the housing. A fourth pawl spring 236 is disposed in the fourth cylinder coaxially around the probe portion of the fourth pawl so that the bottom surface of the piston portion of the pawl rests on the spring and the spring rests on the bottom surface of the cylinder. The probe portion of the fourth pawl extends through the opening in the bottom surface of the cylinder, and depression of the pawl causes the pawl spring to compress and the probe portion to engage an upturned end portion 238 of the first coil spring 76 for obstructing the rotation of this spring in a manner causing it to relax its spring grip. Depression of the fourth pawl is accomplished by means of a fourth cam 240 fixed to the rod 138 and adapted to contact the top surface of the piston portion of the pawl by rotation of the rod.

A fifth pawl member 242 having a cylindrical piston portion 244 and a probe portion 246 is disposed slidably in a fifth cylinder 248 drilled in the housing. The piston portion of the fifth pawl has an approximately hemispherical top surface 250 and a bottom surface 252, and the fifth cylinder has a bottom surface 254 in which there is an opening 256 to the inside of the housing. A fifth pawl spring 258 is disposed in the fifth cylinder coaxially around the probe portion of the fifth pawl so that the bottom surface of the piston portion of the pawl rests on the spring and the spring rests on the bottom surface of the cylinder. The probe portion of the fifth pawl extends through the opening in the bottom surface of the fifth cylinder, and depression of the fifth pawl causes the pawl spring to compress and the probe portion to engage an upturned end portion 260 of the fourth coil spring 118 for obstructing the rotation of this spring in a manner causing it to relax its spring grip. Depression of the fifth pawl is accomplished by means of a fifth cam 262 fixed to the rod 138 and adapted to contact the top surface of the piston portion of the pawl by sliding of the rod.

In operation, the first shaft 12 may be rotated in a clockwise direction as indicated by the arrow adjacent the shaft by any suitable means such as an electric motor (not shown). Clockwise rotary movement of the first shaft rotates the first main bevel gear 24 of the differential in a clockwise direction, and rotates the first auxiliary shaft 30 in a counterclockwise direction through the jackshaft gears 28, 36.

The first, second and third collar members 70, 82, 94 are rotated in the counterclockwise direction by the corresponding pulleys 80, 92, 104 on the first auxiliary shaft, the transmission of rotary movement being by way of the corresponding belts 78, 90, 102 which run over the corresponding pulleys and the pulley portions of the collar members respectively. Each of the three collar members rotates in the counterclockwise direction at a speed determined by the rotational speed ratio afforded by the respective pulley and belt linkage between the collar and the first auxiliary shaft. Pulleys and belts are preferred for smooth operation; and all pulleys and belts are preferably of the cog pulley and timing belt type which have roughened surfaces for preventing slippage. It should be noted, however, that meshing gears or chains and sprockets could be used in place of pulleys and belts.

The first, second and third coil springs 76, 88, 100 serve as simple spring clutches which act to transmit rotary movement between the corresponding collar members 70, 82, 94 and the third auxiliary shaft 54 respectively. Each of the coil springs winds from a collar member onto an adjacent larger diameter portion of the third auxiliary shaft in the clockwise direction. Thus, as the collar member is driven in the counterclockwise direction, the spring tends to tighten its grip. This drives the third auxiliary shaft and the second main bevel gear 56 of the differential in a counterclockwise direction. Since the collar members rotate at different speeds, only one collar drives the third auxiliary shaft and thereby the second main bevel gear of the differential at any one time. Thus, if the first collar member is to drive the third auxiliary shaft, the fourth pawl member 220 will be held out of contact with the upturned end portion 238 of the first coil spring by its own pawl spring 236 allowing the first coil spring to tighten its grip, and the third and second pawl members 198, 176 will be depressed by the corresponding cams 218, 196 so that their probe portions contact the upturned end portions 216, 194 of the second and third coil springs respectively causing these springs to tend to unwind or loosen their grip.

Rotation of the rod 138 controls the depression and release of the first, second, third and fourth pawl members which, in turn, determines which if any of the first, second and third collar members drives the second main bevel gear of the differential. Thus, the cams on the rod are arranged so that by rotating the rod one revolution the following four conditions occur in a cycle of events:

Second and third pawl members depressed; first collar member driving second main bevel gear.

Second and fourth pawl members depressed; second collar member driving second main bevel gear.

Third and fourth pawl members depressed; third collar member driving second main bevel gear.

First, second, third and fourth pawl members depressed, no collar members driving second main bevel gear, and first pawl locking second main bevel gear in place.

In accordance with this control, there are then four rotational speeds of the second main bevel gear of the differential, one of these speeds being zero.

In the mechanical differential, the rotational speeds of the first and second main bevel gears will determine the rotational speed of the spider assembly and thus the rotational speed of the second auxiliary shaft 40 in accordance with the following expression:

$$\vec{w} = \tfrac{1}{2}(\vec{w}_1 + \vec{w}_2)$$

where $\vec{w}$ is the directional rotational speed of the spider gear assembly or the second auxiliary shaft, $\vec{w}_1$ is the directional rotational speed of the first main bevel gear, and $\vec{w}_2$ is the directional rotational speed of the second main bevel gear of the differential. The clockwise rotation as indicated for the first shaft and first main bevel gear may be taken as the positive direction, with counterclockwise rotation taken as the negative direction.

The shaft connections to the differential may be interchanged among the members of the differential to obtain a similar type of operation. Also, planetary types of differentials may be used. However, I prefer to use the ordinary type of differential with the shafts being connected to the particular members as shown.

Having four rotational speeds for the second auxiliary shaft 40, these may be conveniently multiplied to eight rotational speeds of the second shaft 14.

The fourth collar member 106 rotates with the second auxiliary shaft and rotates the sixth collar member 128 by way of the fourth continuous belt 134 which rides over the pulley portion 108 of the sixth collar member. The sixth collar member in turn rotates the fifth collar member 120 by way of the fifth continuous belt 136 which rides over the pulley portion 122 of the fifth collar member and the second pulley portion 132 of the sixth collar member.

In operation, the fifth pawl member 242 is depressed or released by the fifth cam 262 upon sliding the rod 138, this sliding movement of the rod having no effect on the other pawl members. In the depressed position, the probe portion 246 of the fifth pawl member obstructs rotation of the fourth coil spring 118 by contacting its upturned end portion 260. This causes the fourth coil spring to loosen its grip, and the second shaft is rotated by the fifth collar member through the fifth coil spring 126 which tends to tighten its grip as the fifth collar member rotates in the clockwise direction. Thus, when the fifth pawl is depressed, the second auxiliary shaft drives the second shaft according to any rotational speed reduction that may be provided in the mechanical couplings between the sixth and the fourth and fifth collar members. When the fifth pawl member is released, the fourth coil spring is caused to tighten its grip by the rotation of the fourth collar member. This causes the second shaft to turn faster than the fifth collar member and causes the fifth coil spring to relax its grip. When the fifth pawl is in the released position, the second shaft will rotate at the same speed as does the second auxiliary shaft and in the clockwise direction. Thus, eight different rotational speeds of the second shaft are possible with the embodiment of the transmission as described.

Some of the advantages of the transmission are as follows. The differential bevel gear arrangement gives high rotational speed ratios with accuracy and low vibration. Changes in speed are accomplished by means of timing belts and cog pulleys which are smooth in operation, yet can be made by molding processes without resorting to precision machining. Engagement to each pulley is accomplished by a simple spring clutch which requires no particular upkeep and is practically foolproof in positive drive. Since high inertia parts are not subjected to impact, engagement is smooth without clash or noise and practically instantaneous speed changes are possible without a break in recording.

The speed change transmission of Fig. 1 is described in accordance with the speed reduction requirements of many recording instruments. The transmission is relatively simple and of low cost. It may be made very compact, and lends itself to a single control knob or dial, or a push-button type of control for speed selection, making it readily adaptable to instrument assembly. Speed ratios as high as 70,000 to 1 can be obtained between the first and second shafts merely by using suitable cog pulleys and jackshaft gears without change to the balance of the transmission. It should be noted that since reduction takes place in the differential unit, speed changing occurs on the high r.p.m. side of the transmission permitting the use of low torque or small sized components.

The transmission may be modified to meet the particular need of speed reductions or increases of particular instruments.

Figures 2, 3:
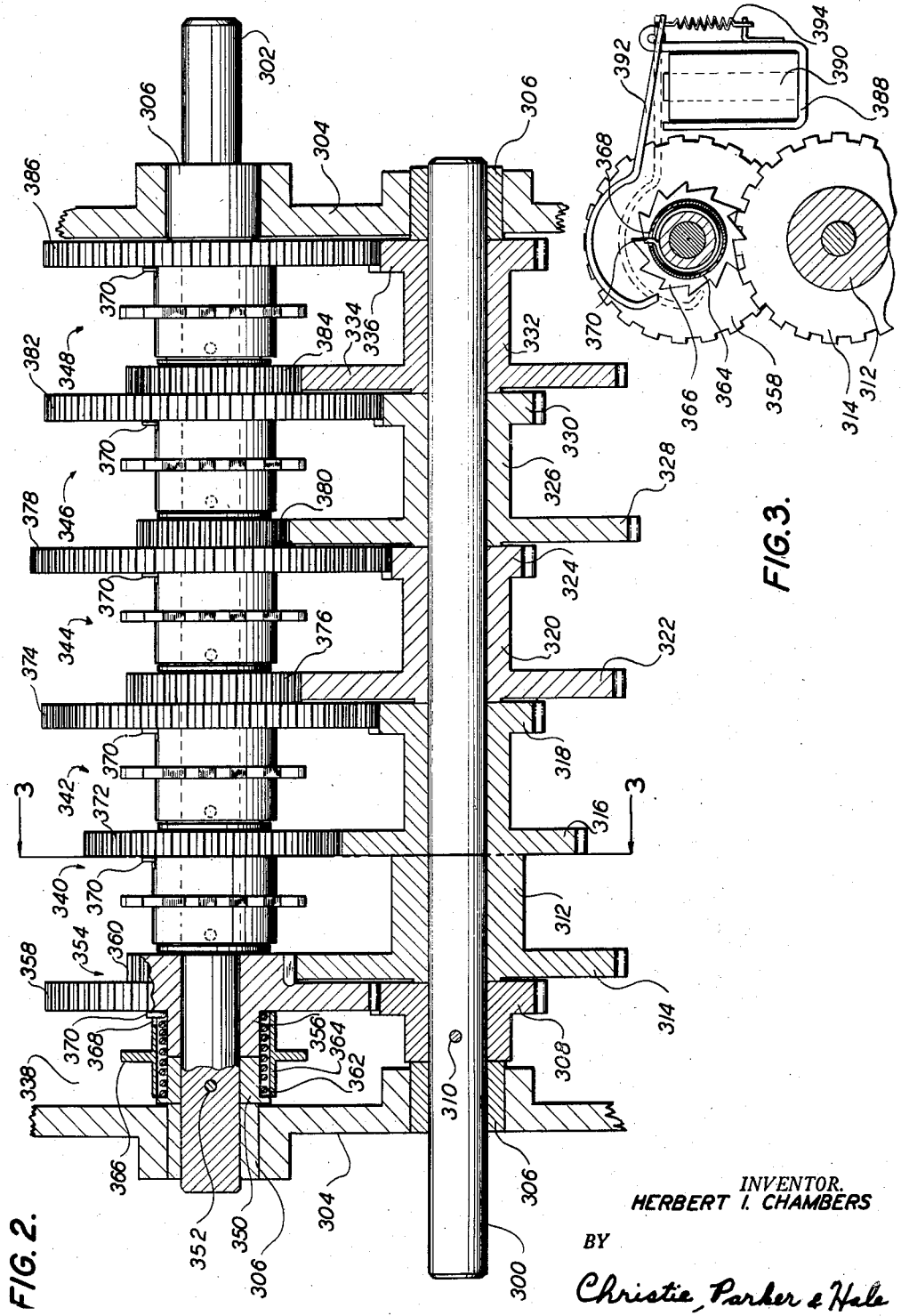
Fig. 2 is a partial sectional view of a second embodiment of the invention.
Fig. 3 is a fragmentary view taken along line 3—3 of Fig. 2, and shows a typical control for the clutching means.

Fig. 2 shows a second embodiment of the speed change transmission of the invention. In view of the understanding gained from the detailed description of the embodiment shown in Fig. 1, the embodiment of Fig. 2 is described in less detail.

A drive shaft 300 and a driven shaft 302 are rotatably mounted to a supporting frame 304 by a plurality of similar bearings 306. The drive shaft and driven shaft are disposed apart and approximately parallel. A drive gear 308 is located on the drive shaft adjacent the inside of one end of the supporting frame and is affixed to the drive shaft by a pin 310. A first gear carrier 312, having a first gear 314, a second gear 316 and a third gear 318 connected axially at spaced positions along its length, is mounted rotatably on the drive shaft adjacent the drive gear. A second gear carrier 320, having a first gear 322 and a second gear 324 connected axially at spaced positions along its length, is mounted rotatably on the drive shaft adjacent the first gear carrier. A third gear carrier 326, having a first gear 328 and a second gear 330 connected axially at spaced positions along its length, is mounted rotatably on the drive shaft adjacent the third gear carrier. A fourth gear carrier 332, having a first gear 334 and a second gear 336 connected axially at spaced positions along its length, is mounted rotatably on the drive shaft between the fourth gear carrier and the inside end of the supporting frame opposite the end at which the drive gear is located.

First, second, third, fourth, fifth and sixth clutch assemblies 338, 340, 342, 344, 346, 348 respectively are mounted along the driven shaft inside the supporting frame.

The first clutch assembly typically includes a cylindrical member 350 affixed axially on the driven shaft by a pin 352 so that the member acts as an enlarged diameter portion of the driven shaft. A collar member 354 is mounted rotatably on the driven shaft. The collar member has a cylindrical portion 356 disposed adjacent the cylindrical member, and a first and second gear 358, 360 connected axially at one end. The diameter of the cylindrical member and the diameter of the cylindrical portion of the collar member are substantially equal. A coil spring 362 is wound about the periphery of the cylindrical member and extends to wind about the periphery of the cylindrical portion of the collar member. A cylindrical spring cover 364 having a sprocket 366 and a slot 368 fits over the coil spring. The coil spring has an upturned end 370 which fits into the slot.

All of the six clutch assemblies are alike, with the exception of the number and size of the gears connected on their respective collar members. Therefore, the detailed description of the first clutch assembly is intended as typical of the other five clutch assemblies.

The first and second gears 358, 360 of the first clutch assembly mesh with the drive gear 308 and the first gear 314 of the first gear carrier 312 respectively.

The second clutch assembly has a single gear 372 which meshes with the second gear 316 of the first gear carrier 312.

The third clutch assembly has a first gear 374 and a second gear 376 which mesh respectively with the third gear 318 of the first gear carrier 312 and the first gear 322 of the second gear carrier 320.

The fourth clutch assembly has a first gear 378 and a second gear 380 which mesh respectively with the second gear 324 of the second gear carrier 320 and the first gear 328 of the third gear carrier 326.

The fifth clutch assembly has a first gear 382 and a second gear 384 which mesh respectively with the second gear 330 of the third gear carrier 326 and the first gear 334 of the fourth gear carrier 332.

The sixth clutch assembly has a single gear 386 which meshes with the second gear 336 of the fourth gear carrier 332.

In operation, the drive shaft 300 receives its input from any suitable means such as an electric motor (not shown). When turned in the counterclockwise direction (so chosen to be consistent with Fig. 1), the drive shaft rotates the drive gear 308 in the same counterclockwise direction.

The drive gear rotates the collar member of the first clutch assembly in the clockwise direction at a speed determined by the gear ratio between the drive gear and the first gear of the first clutch assembly. The second gear of the first clutch assembly rotates the first gear carrier in the counterclockwise direction at a speed determined by the gear ratio between the second gear of the first clutch assembly and the first gear carrier. This mechanical analysis may be carried out through the entire train of gears. The result is that the collar member of each of the six clutch assemblies is driven in the clockwise direction by the drive shaft, which is a common rotatable member coupled to the collar members by the various gears. Speed is determined by the various gear ratios between the drive shaft and the respective collar members.

By holding the cylindrical spring cover 364 of the first clutch assembly stationary, the upturned end 370 of the coil spring 364 will prevent the spring from rotating, causing the spring to tend to unwind. Thus, no rotary movement will be transmitted from the collar member of the first clutch assembly to the driven shaft. This operation is typical of all six of the clutch assemblies.

Six different rotational speeds are available, one from the collar member of each of the six clutch assemblies. To engage the driven shaft at any one of these speeds, the spring cover of a selected clutch assembly is released which allows the coil spring of that clutch assembly to tighten and transmit rotary movement from the collar member to the driven shaft.

With reference to Fig. 3, a means typical of those which may be used to control the action of the various clutches is shown.

The control means comprises a frame 388 housing a solenoid 390. A pawl member 392 is pivoted to the frame and held up from the solenoid by an auxiliary spring 394. When the solenoid is actuated, the pawl is urged toward the solenoid and engages the sprocket 366 of the cylindrical spring cover 364 preventing rotation of the spring cover. The upturned end 370 of the coil spring 362, being caught in the slot 368 of the spring cover, prevents rotation of the coil spring causing the coil spring to tend to unwind and loosen its grip. When the solenoid is de-activated, the auxiliary spring 394 pulls the pawl out of engagement with the sprocket, allowing the spring cover to rotate and the coil spring to tighten its grip.

A control means identical to that of Fig. 3 is utilized in conjunction with each of the clutch assemblies, and permits of an electric push-button kind of control for changing the output rotary speeds of the transmission.

In the following claims, the term "coupled" refers to any direct or indirect mechanical connection between two parts enabling the transfer of rotary movement between the two parts.

I claim:

1. Speed change transmission apparatus comprising a rotatable shaft having a plurality of greater and lesser diameter portions provided alternately along its length, a plurality of collar members rotatably mounted on the shaft and severally located on the alternate lesser diameter portions of the shaft, a plurality of coil springs located axially on the shaft for releasably engaging the respective collar members with the adjacent greater diameter portions of the shaft, a common rotatable member, and means coupling each collar member to the common rotatable member.

2. Speed change transmission apparatus comprising a rotatable shaft having a plurality of greater and lesser diameter portions provided alternately along its length, a plurality of collar members rotatably mounted on the shaft and severally located on the alternate lesser diameter portions of the shaft, a plurality of coil springs located axially on the shaft for releasably engaging the respective collar members with the adjacent greater diameter portions of the shaft, each of the coil springs winding about the periphery of a collar member and extending to wind about the periphery of an adjacent greater diameter portion of the shaft, and means for driving each of the collar members at a different speed.

3. Speed change transmission apparatus comprising a rotatable shaft having a plurality of greater and lesser diameter portions provided alternately along its length, a plurality of collar members rotatably mounted on the shaft and severally located on the alternate lesser diameter portions of the shaft, a plurality of coil springs located axially on the shaft for releasably engaging the respective collar members with the adjacent greater diameter portions of the shaft, with each of the coil springs winding about the periphery of a collar member and an adjacent greater diameter portion of the shaft and exerting a grip, means for controlling the grip exerted by each of the coil springs, and means for driving each collar member at a different speed.

4. Speed change transmission apparatus comprising a rotatable shaft having alternately greater and lesser diameter portions provided along its length, a plurality of collar members rotatably mounted on the shaft, with the collar members being severally located on the alternate lesser diameter portions of the shaft and with each collar member having a cylindrical portion disposed adjacent a greater diameter portion of the shaft, a plurality of coil springs severally located axially on the alternate greater diameter portions of the shaft and extending onto the adjacent cylindrical portions of the collar members, each of the coil springs providing a grip for releasably engaging the respective collar members with the adjacent greater diameter portions of the shaft, means for controlling the grip exerted by each of the coil springs, a common rotatable member mounted apart from the shaft, and means coupling each collar member to the common rotatable member.

5. Apparatus according to claim 4 wherein each of the coil springs has an upturned end portion, and wherein the means for controlling the grip exerted by the coil springs comprises a plurality of pawl members for engaging the upturned end portions of the coil springs, and means for selectively controlling the action of the pawl members.

6. Speed change transmission apparatus comprising a rotatable driven shaft having alternately greater and lesser diameter portions provided along its length, a plurality of collar members rotatably mounted on the driven shaft, the collar members being severally located on the alternate lesser diameter portions of the driven shaft and with each collar member having a cylindrical portion disposed adjacent a greater diameter portion of the driven shaft, a plurality of coil springs severally located axially on the alternate greater diameter portions of the driven shaft and extending onto the adjacent cylindrical portions of the collar members, each of the coil springs providing a grip for releasably engaging the respective collar members with the adjacent greater diameter portion of the driven shaft, means for controlling the grip exerted by each of the coil springs, a rotatable drive shaft, and a plurality of mechanical linkages coupling the collar members to the drive shaft, said mechanical linkages providing a different rotational ratio between each of the collar members and the drive shaft.

7. Apparatus according to claim 6 wherein each of the coil springs has an upturned end portion, and wherein the means for controlling the grip exerted by the coil springs comprises a plurality of cylindrical spring covers severally disposed axially on the coil springs, each of the spring covers having a sprocket and having a slot for accommodating the upturned end portion of the spring on which it is located, a plurality of pawl members for engaging the sprockets of the spring covers, and means for selectively controlling the action of the pawl members.

8. Speed change transmission apparatus for transmitting rotary movement between a first rotatable shaft and a second rotatable shaft and providing a selection of rotational ratios between the shafts comprising a differential having a first rotatable member and a second rotatable member and a third rotatable member, the rotatable members of the differential being interconnected so that the rotational speed of the first member combined with the rotational speed of the second member determines the rotational speed of the third member, the first member of the differential being coupled to the first shaft, the third member of the differential being coupled to the second shaft, a third rotatable shaft having alternately greater and lesser diameter portions provided along its length, the third shaft being coupled to the second member of the differential, a plurality of collar members rotatably mounted on the third shaft and severally located on the lesser diameter portions of the third shaft correspondingly adjacent the greater diameter portions, a plurality of mechanical linkages severally coupling corresponding collar members to the first shaft in accordance with different rotational ratios, a plurality of coil springs severally disposed coaxially about the periphery of the collar members and respective adjacent greater diameter portions of the third shaft, with each coil spring holding a collar member and an adjacent greater diameter portion of the third shaft in a spring grip, and means for controlling the grip exerted by each of the coil springs.

9. Apparatus according to claim 8 wherein the third member of the differential is coupled to the second shaft by means which comprises a separate shaft coupled to the third member of the differential, and a plurality of controllable clutches intercoupling the separate shaft with the second shaft, including a plurality of collar members disposed on the separate shaft and a plurality of coil springs for releasably engaging pairs of the collar members.

10. Apparatus according to claim 8 wherein each of the coil springs has an upturned end portion, and wherein the means for controlling the grip exerted by the coil springs comprises a plurality of controllable pawl members for selectively engaging the upturned end portions of corresponding coil springs.

11. Speed change transmission apparatus for transmitting rotary movement from a first rotatable shaft to a second rotatable shaft and for controlling the rotational speed of the second shaft comprising a mechanical differential having a first rotatable member and a second rotatable member and a third rotatable member, the rotatable members of the differential being intercoupled so that the rotational speed of the first member combined with the rotational speed of the second member determines the rotational speed of the third member, the first rotatable member being coupled to the first shaft, a third rotatable shaft coupled to the second rotatable member and having portions along its length which are alternately of greater and lesser diameter, a plurality of collar members each of which has a cylindrical portion and is adapted to fit rotatably on a corresponding lesser diameter portion of the third shaft, the outer diameter of the cylindrical portions of the collars being approximately equal to the outer diameters of the corresponding adjacent greater diameter portions of the third shaft respectively, a fourth rotatable shaft disposed apart from and approximately parallel to the third shaft, means coupling the fourth shaft to the first shaft, a plurality of mechanical linkages each connected to the fourth shaft and to a separate corresponding collar member of the plurality of collar members and providing a different rotational ratio between each collar member and the fourth shaft, a plurality of coil springs with each of the coil springs being disposed coaxially on the cylindrical portion of a corresponding collar member of the plurality of collar members and overlapping onto the corresponding adjacent greater diameter portion of the third shaft, each coil spring holding the corresponding collar member and greater diameter portion in a spring grip for transmitting rotary movement from the collar member to the third shaft, means for controlling the grip exerted by each of the coil springs, and the third member of the differential being coupled to the second shaft.

12. Apparatus according to claim 11 wherein the third member of the differential is coupled to the second shaft by means which comprises a separate shaft coupled to the third member of the differential, a first collar member fixed on the separate shaft, a second collar member rotatably mounted on the separate shaft, and having a greater diameter portion and a lesser diameter portion, a third collar member rotatably mounted on the lesser diameter portion of the second collar member, means coupling the first collar member to the third collar member, a first coil spring disposed coaxially about the periphery of a length of the lesser diameter portion of the second collar member and extending onto the periphery of the first collar member, and a second coil spring disposed coaxially about the periphery of the greater diameter portion of the second collar member and extending onto the periphery of the third collar member, the second collar member being coupled to the second shaft.

13. Apparatus according to claim 11 wherein each mechanical linkage of the plurality of mechanical linkages includes a first pulley formed integrally with a corresponding collar member of the plurality of collar members, a second pulley fixed on the fourth rotatable shaft so that it is rotated by the shaft, and a cooperating belt which rides over the first and second pulleys for transmitting rotary movement from the second pulley to the first pulley in accordance with the particular rotational ratio as determined by the respective diameters of the first and second pulleys.

14. Apparatus according to claim 11 wherein each of the coil springs has an upturned end portion, and wherein the means for controlling the grip exerted by each of the coil springs includes a rotatable rod having a plurality of cams disposed along its length, and a corresponding plurality of pawl members each of which is adapted to be moved by one of the cams to engage an upturned portion of a coil spring, causing the coil spring to tend to unwind and thereby to lose its grip.

15. Speed change transmission comprising a differential having a first rotatable member and a second rotatable member and a third rotatable member, the rotatable members of the differential being interconnected so that the rotational speed of the first member combined with the rotational speed of the second member determines the rotational speed of the third member, a first rotatable shaft coupled to the first member, a second rotatable shaft coupled to the third member, means for transmitting rotary movement between the first shaft and the second member in accordance with a first rotational ratio, and means for transmitting rotary movement between the first shaft and the second member in accordance with a second rotational ratio, each of said last two means having an engageable clutch included serially therein, thereby affording a choice of rotational ratios between the first shaft and the second shaft.

16. Speed change transmission comprising a differential having a first rotatable member and a second rotatable member and a third rotatable member, the rotatable members of the differential being interconnected so that the rotational speed of the first member combined with the rotational speed of the second member determines the rotational speed of the third member, a first rotatable shaft coupled to the first member, means for transmitting rotary movement between the first shaft and the second member in accordance with a first rotational ratio, means for transmitting rotary movement between the first shaft and the second member in accordance with a second rotational ratio, each of said means for transmitting rotary movement between the first shaft and the second member having an engageable clutch included serially therein, thereby affording a choice of rotational ratios between the first shaft and the second member, means for transmitting rotary movement between the third member and the second shaft in accordance with a first rotational ratio, and means for transmitting rotary movement between the third member and the second shaft in accordance with a second rotational ratio, each of said means for transmitting rotary movement between the third member and the second shaft having an engageable clutch included serially therein, thereby affording a choice of rotational ratios between the third member and the second shaft.

References Cited in the file of this patent

UNITED STATES PATENTS

| | | |
|---|---|---|
| 2,342,149 | Kinser | Feb. 22, 1944 |
| 2,643,749 | Greenlee | June 30, 1953 |
| 2,660,899 | McCammon | Dec. 1, 1953 |
| 2,675,710 | Ruhland | Apr. 20, 1954 |